United States Patent
Koizumi et al.

(10) Patent No.: US 10,227,797 B2
(45) Date of Patent: Mar. 12, 2019

(54) DOOR HANDLE DEVICE FOR VEHICLE

(71) Applicant: AISIN SEIKI KABUSHIKI KAISHA, Kariya-shi (JP)

(72) Inventors: Takaaki Koizumi, Obu (JP); Takehiro Tabata, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/670,113

(22) Filed: Aug. 7, 2017

(65) Prior Publication Data

US 2018/0066460 A1    Mar. 8, 2018

(30) Foreign Application Priority Data

Sep. 8, 2016  (JP) .................................. 2016-175668

(51) Int. Cl.
*E05B 81/88* (2014.01)
*E05B 85/10* (2014.01)
(Continued)

(52) U.S. Cl.
CPC .............. *E05B 81/88* (2013.01); *E05B 81/77* (2013.01); *E05B 85/10* (2013.01); *G07C 9/00174* (2013.01); *H01Q 1/3283* (2013.01); *H02J 50/20* (2016.02); *H02M 1/10* (2013.01); *H02M 1/32* (2013.01); *H02M 7/06* (2013.01); *G07C 2209/63* (2013.01)

(58) Field of Classification Search
CPC ............ E05B 81/77; E05B 81/88; G01D 5/24
USPC ....................................................... 341/713
See application file for complete search history.

(56) References Cited

U.S. PATENT DOCUMENTS

| | | | | |
|---|---|---|---|---|
| 8,305,090 B2 * | 11/2012 | Tsuchida | ................. | E05B 81/76 324/658 |
| 2009/0251382 A1 * | 10/2009 | Umehara | ............... | H01Q 1/362 343/850 |

(Continued)

FOREIGN PATENT DOCUMENTS

| JP | 2012-154118 | 8/2012 |
|---|---|---|
| JP | 2012-154119 | 8/2012 |

OTHER PUBLICATIONS

Extended European Search Report dated Jan. 31, 2018 in Patent Application No. 17189543.6, citing documents AA-AC therein, 4 pages.

*Primary Examiner* — Peguy Jean Pierre
(74) *Attorney, Agent, or Firm* — Oblon, McClelland, Maier & Neustadt, L.L.P.

(57) ABSTRACT

A door handle device for a vehicle includes: an antenna and a DC driving detection member capable of detecting approach or contact of a person, the antenna and the DC driving detection member being electrically connected to a drive control portion via a first connection line and a second connection line, and being connected in parallel to each other. The antenna is driven by an AC voltage supplied from the drive control portion, the first connection line and the second connection line are respectively connected to a positive DC power source and a ground, and thereby the detection member is driven by a DC voltage supplied from the drive control portion, the antenna includes a resonance capacitor and an antenna coil which are connected in series. The detection member includes a power source terminal, and a ground terminal.

16 Claims, 6 Drawing Sheets

(51) Int. Cl.
*H01Q 1/32* (2006.01)
*G07C 9/00* (2006.01)
*H02M 1/10* (2006.01)
*H02M 1/32* (2007.01)
*H02M 7/06* (2006.01)
*H02J 50/20* (2016.01)

(56) References Cited

U.S. PATENT DOCUMENTS

2010/0253141 A1 10/2010 Cara et al.
2013/0223117 A1 8/2013 Koshy
2014/0015597 A1 1/2014 Tabata et al.
2017/0016255 A1* 1/2017 Guibbert ................ E05B 81/77
2017/0063154 A1* 3/2017 Minami ................ H02J 50/10

* cited by examiner

DOOR HANDLE DEVICE FOR VEHICLE

CROSS REFERENCE TO RELATED APPLICATIONS

This application is based on and claims priority under 35 U.S.C. § 119 to Japanese Patent Application 2016-175668, filed on Sep. 8, 2016, the entire contents of which are incorporated herein by reference.

TECHNICAL FIELD

This disclosure relates to a door handle device for a vehicle.

BACKGROUND DISCUSSION

In the related art, as a door handle device for a vehicle, for example, a device described in JP2012-154119A (Reference 1) is known. The door handle device for a vehicle has a detection member (person detection IC), an antenna, and two electric wires (connection wires) connecting the door handle device for a vehicle and a drive control portion (ECU). The two electric wires are shared as a power supply for the detection member and a power supply (for driving) for the antenna. That is, when the antenna is not driven, a DC voltage is supplied from the ECU to the detection member via the two electric wires and when the antenna is driven, an AC voltage is supplied from the ECU to the antenna via the two electric wires. Particularly, it has been proposed to utilize an induced voltage (resonance voltage) of the antenna in order to avoid disconnection of the power supply to the detection member when driving the antenna.

However, in Reference 1, since the induced voltage of the antenna is utilized to supply power to the detection member, it is necessary to set the induced voltage to a rated voltage of the detection member or less. In this case, for example, if it is tried to suppress an output level of the antenna, a communication distance is shortened and convenience may be impaired.

Thus, a need exists for a door handle device for a vehicle which is not susceptible to the drawback mentioned above.

SUMMARY

A door handle device for a vehicle according to an aspect of this disclosure includes an antenna and a detection member capable of detecting approach or contact of a person. The antenna and a detection member are electricity connected to a drive control portion via a first connection line and a second connection line, and are connected in parallel to each other. The antenna is driven by an AC voltage supplied from the drive control portion, the first connection line and the second connection line are respectively connected to a positive DC power source and a ground, and thereby the detection member is driven by a DC voltage supplied from the drive control portion. The antenna includes a resonance capacitor and an antenna coil which are connected in series. The detection member includes a power source terminal which is electrically connected to the first connection line and a connection point between the resonance capacitor and the antenna coil respectively via a first diode and a second diode, and a ground terminal which is electrically connected to the second connection line. The door handle device further includes a charge control circuit, which includes a switch that is electrically connected to the power source terminal and the ground terminal, and performs a switching operation in accordance with a control signal.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Hereinafter, a first embodiment of a door handle device for a vehicle will be described. The embodiment constitutes a Smart Entry (registered trademark) system for locking and unlocking a vehicle door by wireless communication with a portable device carried by a user of a vehicle.

Figure 1:
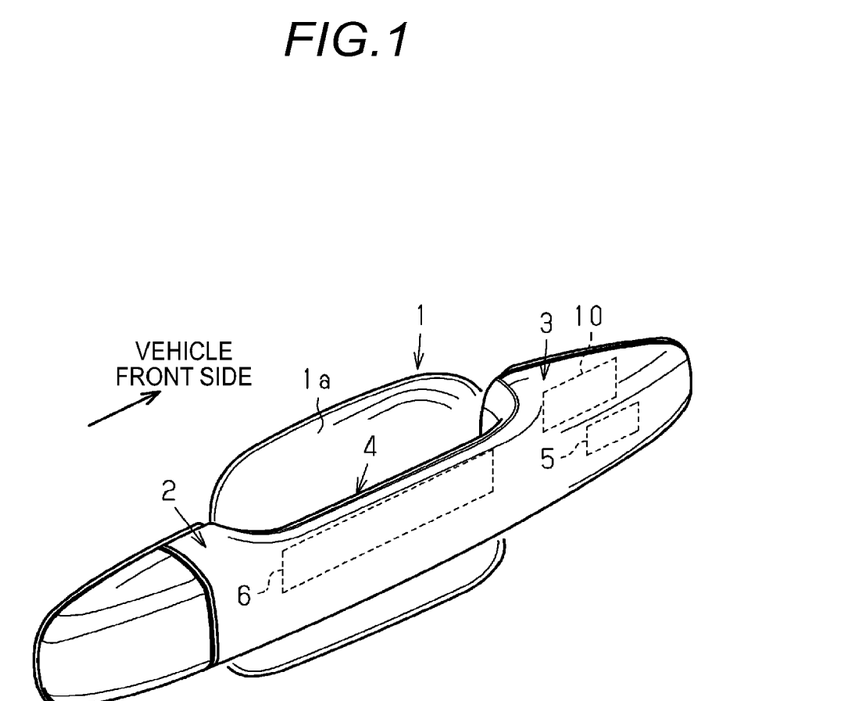
FIG. 1 is a perspective view illustrating an outside door handle.

As illustrated in FIG. 1, an outside door handle 2 is provided on a door outer panel 1 constituting the vehicle door. The outside door handle 2 extends in a forward and rearward direction of a vehicle and is attached to the door outer panel 1 at two front and rear places. Moreover, a recessed portion 1a facing the outside door handle 2 is formed inwardly in the door outer panel 1. The recessed portion 1a is formed such that a person can easily grip the vicinity of a center of the outside door handle 2 with his/her hand.

The outside door handle 2 is formed in a hollow shape having an internal space with, for example, a resin material. A detection region capable of detecting approach or contact of a person is provided on an outer wall surface of the outside door handle 2. That is, a lock detection region 3 capable of detecting approach or contact of the hand of a person intended to lock of the vehicle door is provided on the outer wall surface of a front side portion of the outside door handle 2. In addition, an unlock detection region 4 capable of detecting approach or contact of the hand of a person intended to unlock the vehicle door is provided on an outer wall surface of an intermediate portion which is a grip portion of the outside door handle 2. A substantially rectangular lock sensor electrode 5 made of, for example, a metal plate is accommodated at a position closer to a surface away from the door outer panel 1 in conformity with the lock detection region 3 inside the outside door handle 2. A substantially rectangular unlock sensor electrode 6 made of, for example, a metal plate is accommodated in the vicinity of the door outer panel 1 in conformity with the unlock detection region 4. The unlock sensor electrode 6 is formed larger than the lock sensor electrode 5 in size.

Moreover, a module 10 which is electrically connected to the lock sensor electrode 5 and the unlock sensor electrode 6 is accommodated in the outside door handle 2.

Next, an electrical configuration of the embodiment will be described.

Figure 2:
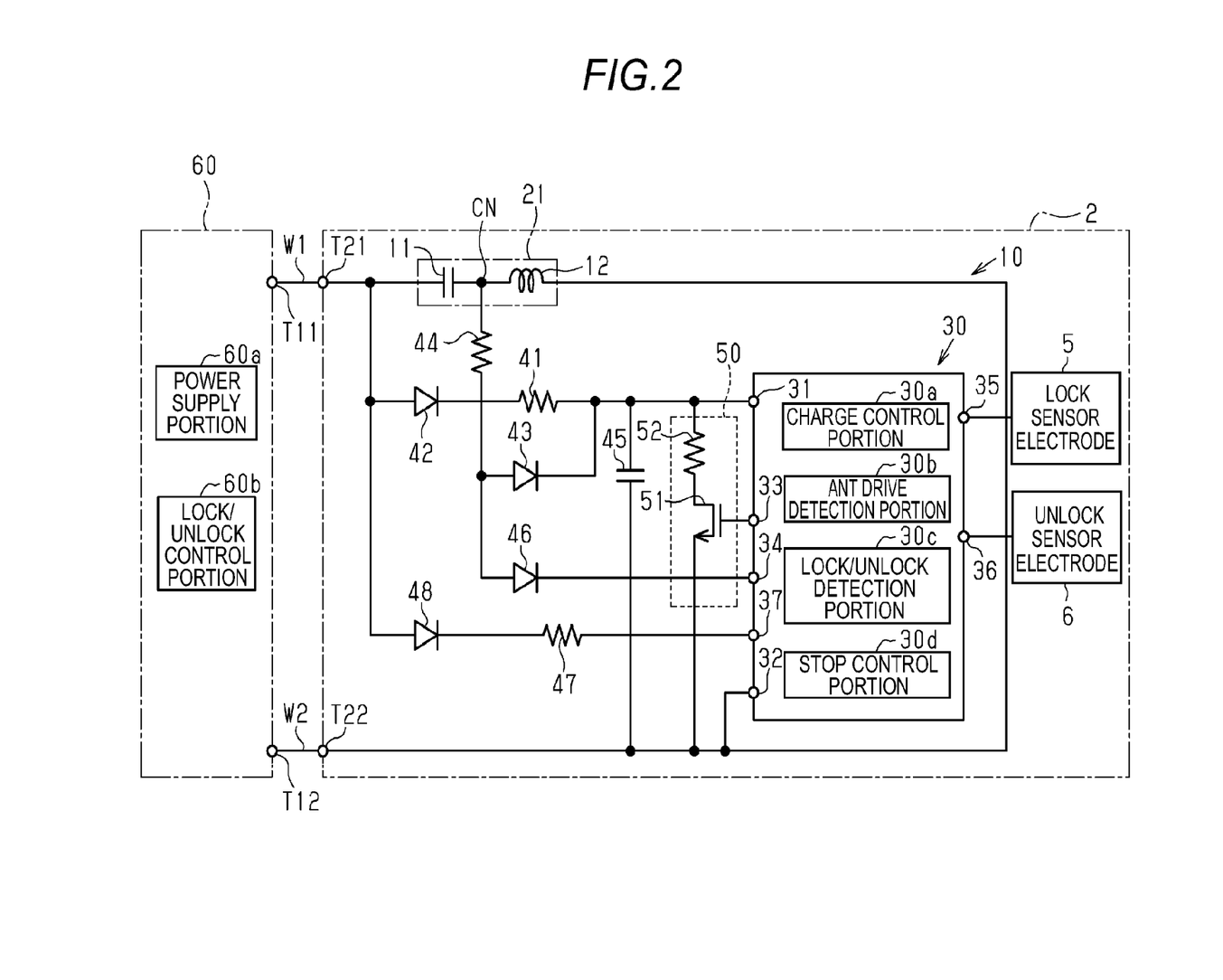
FIG. 2 is a circuit block diagram illustrating an electrical configuration of a door handle device for a vehicle of a first embodiment.

As illustrated in FIG. 2, a drive ECU 60 as a drive control portion is constituted by, for example, a microcomputer, an inverter, and the like, and has a power supply portion 60a and an lock/unlock control portion 60b. The drive ECU 60 is connected to one end of a first electric wire W1 as a first connection wire at a first control portion-side terminal T11 and the other end of the first electric wire W1 is connected to a first module-side terminal T21 of the module 10. In addition, the drive ECU 60 is connected to one end of a second electric wire W2 as a second connection wire at a second control portion-side terminal T12 and the other end of the second electric wire W2 is connected to a second module-side terminal T22 of the module 10. That is, the drive ECU 60 and the module 10 are connected by two first and second electric wires W1 and W2.

Moreover, the power supply portion 60a supplies an AC voltage (rectangular wave voltage) having a frequency matching a resonance frequency f1 to the module 10 via the first and second electric wires W1 and W2. Alternatively, the first electric wire W1 and the second electric wire W2 are respectively connected to a battery +B as a positive DC power source and a ground, and thereby the power supply portion 60a supplies a DC voltage (battery voltage) to the module 10 via the first and second electric wires W1 and W2.

The module 10 is provided with an antenna resonance capacitor 11 as a resonance capacitor of which one end is connected to the first module-side terminal T21, and is also provided with an antenna coil 12 of which one end is connected to the other end of the antenna resonance capacitor 11. The other end of the antenna coil 12 is connected to the second module-side terminal T22. The antenna resonance capacitor 11 and the antenna coil 12 constitute an LF antenna 21 as an antenna thereby constituting an LC series resonance circuit of the resonance frequency f1.

Therefore, when the power supply portion 60a supplies an AC voltage (rectangular wave voltage) matching the resonance frequency f1 via the first electric wire W1 and the second electric wire W2, the antenna coil 12 (LF antenna 21) is driven and a wireless signal is output from the antenna coil 12. Moreover, the wireless signal is, for example, an inquiry signal (request signal) to the portable device carried by a user of a vehicle and the portable device receiving the inquiry signal transmits a signal having a unique ID code.

In addition, the module 10 is provided with a sensor IC 30 as a detection member. The sensor IC 30 has a power source terminal 31, a ground terminal 32, a switch control terminal 33, an antenna drive detection terminal 34, a lock detection input terminal 35, an unlock detection input terminal 36, and a detection signal output terminal 37.

The power source terminal 31 is connected to one end of a resistor 41 and the other end of the resistor 41 is connected to a cathode of a first diode 42 for negative voltage prevention. The anode of the first diode 42 is connected to the first module-side terminal T21. On the other hand, the ground terminal 32 is connected to the second module-side terminal T22.

Therefore, for example, if the power supply portion 60a connects the first electric wire W1 and the second electric wire W2 respectively to the battery +8 and the ground, the power source terminal 31 is connected to the battery +B via the resistor 41 and the first diode 42, the ground terminal 32 is connected to the ground, the DC voltage is supplied from the drive ECU 60, and thereby the sensor IC 30 is driven. That is, the LF antenna 21 and the sensor IC 30 are electrically connected to the drive ECU 60 in a state of being connected in parallel to each other.

In addition, the power source terminal 31 is connected to a cathode of a second diode 43 for negative voltage prevention and an anode of the second diode 43 is connected to one end of a resistor 44. The other end of the resistor 44 is connected to a connection point CN between the antenna resonance capacitor 11 and the antenna coil 12. In addition, a smoothing capacitor 45 is connected between the power source terminal 31 and the ground terminal 32. The resistor 44 and the capacitor 45 constitute a smoothing circuit.

Therefore, when the power supply portion 60a supplies the AC voltage (rectangular wave voltage), a current drawn from the antenna coil 12 by the resistor 44 is rectified by the second diode 43, the DC voltage is supplied to the power source terminal 31 and the ground terminal 32 in a manner to be smoothed in the capacitor 45, and thereby the sensor IC 30 is driven. That is, during driving the LF antenna 21 (in the driving state), the sensor IC 30 is driven by using an induced voltage (resonance voltage) of the LF antenna 21.

The switch control terminal 33 is connected to a gate of an N-channel MOSFET 51 as a switch. A drain of the MOSFET 51 is connected to one end of a current limiting resistor 52 and the other end of the current limiting resistor 52 is connected to the power source terminal 31. A source of the MOSFET 51 is connected to the ground terminal 32.

The sensor IC 30 has a charge control portion 30a, a control signal is output from the switch control terminal 33 to the gate of the MOSFET 51 by the charge control portion 30a, and thereby the sensor IC 30 switching-controls the MOSFET 51. That is, the charge control portion 30a outputs a control signal of a high (H) level thereby causing the MOSFET 51 to be a conduction state and outputs a control signal of a low (L) level thereby causing the MOSFET 51 to be in a non-conduction state. When the power supply portion 60a supplies the AC voltage (rectangular wave voltage), the MOSFET 51 is turned to the conduction state by the control signal, a charge (current) is absorbed on a MOSFET 51 side, and thereby the charge control portion 30a suppresses that the voltage (input voltage) of the power source terminal 31 is excessive, for example, the voltage of the power source terminal 31 exceeds a rated voltage of the sensor IC 30. The MOSFET 51 and the current limiting resistor 52 constitute a charge control circuit 50.

The antenna drive detection terminal 34 is connected to the cathode of a third diode 46 for negative voltage prevention and an anode of the third diode 46 is connected to one end of the resistor 44. That is, the antenna drive detection terminal 34 is connected to the connection point CN via the third diode 46 and the resistor 44. Therefore, when the power supply portion 60a supplies the AC voltage (rectangular wave voltage), the current drawn from the antenna coil 12 by the resistor 44 is rectified by the third diode 46 and is input into the antenna drive detection terminal 34.

The sensor IC 30 has an antenna drive detection portion 30b and a voltage corresponding to the current supplied to the antenna drive detection terminal 34 is detected by the antenna drive detection portion 30b. The antenna drive detection portion 30b detects (determines) whether or not the LF antenna 21 is being driven (driving state) based on a level (effective value) of the detected voltage. Specifically, the antenna drive detection portion 30b includes, for example, a comparator, or the like, and in a case where the level of the voltage exceeds a predetermined threshold value, it is detected that the LF antenna 21 is being driven. Moreover, the charge control portion 30a outputs a control signal so that the MOSFET 51 is turned to the conduction state when it is detected that the LF antenna 21 is being driven in the antenna drive detection portion 30b.

The lock detection input terminal 35 and the unlock detection input terminal 36 are respectively connected to the lock sensor electrode 5 and the unlock sensor electrode 6. The sensor IC 30 has a lock/unlock detection portion 30c constituting an appropriate electrostatic capacity-type sensor together with the lock sensor electrode 5 or the unlock sensor electrode 6. Power is supplied to the lock sensor electrode 5 and the unlock sensor electrode 6 via the lock detection input terminal 35 and the unlock detection input terminal 36 respectively by the lock/unlock detection portion 30c. The lock/unlock detection portion 30c detects respectively changes in an electrostatic capacitance between the lock sensor electrode 5 and the unlock sensor electrode 6, and the door outer panel 1 thereby detecting the presence or absence of approach or contact of a person to the lock detection region 3 or the unlock detection region 4.

The detection signal output terminal 37 is connected to one end of a resistor 47 and the other end of the resistor 47 is connected to the cathode of a fourth diode 48 for negative voltage prevention. An anode of the fourth diode 48 is connected to the first module-side terminal T21. The lock/unlock detection portion 30c outputs a lock detection signal or an unlock detection signal indicating a detection result of the presence or absence of approach or contact which is described above from the detection signal output terminal 37 to the drive ECU 60 via the resistor 47, the fourth diode 48, and the first electric wire W1. Specifically, the lock/unlock detection portion 30c has an appropriate constant current source and generates and outputs the lock detection signal and the unlock detection signal in a manner to draw currents from the drive ECU 60 to the detection signal output terminal 37 via the first electric wire W1, the fourth diode 48, and the resistor 47 at different cycles to each other.

Moreover, when the lock detection signal or the unlock detection signal is output to the drive ECU 60 via the first electric wire W1 or the like, a voltage drop corresponding to the cycle occurs on a drive ECU 60 side. The lock/unlock control portion 60b detects the lock detection signal or the unlock detection signal based on the voltage drop. The lock/unlock control portion 60b issues a lock command of the vehicle door by detecting the lock detection signal and issues an unlock command of the vehicle door by detecting the unlock detection signal.

In addition, the sensor IC 30 has a stop control portion 30d and a detection result in the antenna drive detection portion 30b is acquired by the stop control portion 30d. In a case where it is detected the LF antenna 21 is being driven, the stop control portion 30d stops a function of the sensor IC 30. Specifically, the stop control portion 30d transmits a stop command to the lock/unlock detection portion 30c and stops an output of a detection signal from the detection signal output terminal 37. Alternatively, the stop control portion 30d may stop a power supply to the lock sensor electrode 5 and the unlock sensor electrode 6 by the lock/unlock detection portion 30c. Alternatively, the stop control portion 30d may stop entire functions of the lock/unlock detection portion 30c.

Moreover, in a case where it is detected that the LF antenna 21 is not being driven by the antenna drive detection portion 30b, the stop control portion 30d releases function stop of the sensor IC 30 (restores the function of the sensor IC 30).

Next, an effect will be described together with an operation of the embodiment.

(1) In the embodiment, the LF antenna 21 is driven by supplying the AC voltage from the drive ECU 60 respectively via the first electric wire W1 and the second electric wire W2.

On the other hand, when the LF antenna 21 is not driven, the power source terminal 31 is connected to the battery +B via the first diode 42 and the first electric wire W1, the ground terminal 32 is connected to the ground via the second electric wire W2, and the DC voltage is supplied from the drive ECU 60, and thereby the sensor IC 30 is driven and capable of detecting approach or contact of a person. In this case, the MOSFET 51 is kept in the non-conduction state by the control signal and thereby the charge control portion 30a prevents a charge (current) from being absorbed on the MOSFET 51 side.

Alternatively, when the LF antenna 21 is driven, the power source terminal 31 is connected to the connection point CN between the antenna resonance capacitor 11 and the antenna coil 12 via the second diode 43, the induced voltage is supplied to the LF antenna 21, and thereby the sensor IC 30 is driven. The sensor IC 30 is capable of detecting approach or contact of a person. In this case, even if the induced voltage of the LF antenna 21 is excessive, the MOSFET 51 of the charge control circuit 50 is turned to the conduction state by the control signal, a charge (current) is drawn on the MOSFET 51 side, and thereby it is possible to suppress that the voltage (input voltage) of the power source terminal 31 is excessive. In other words, it is possible to secure the induced voltage of the LF antenna 21, that is, the output level of the LF antenna 21 and it is possible to preferably secure the communication distance without an excessive voltage (input voltage) of the power source terminal 31. As a communicable range between the LF antenna 21 and the portable device can be expanded, it is possible to further improve convenience.

(2) In the embodiment, the charge control circuit 50 has the current limiting resistor 52 which is connected in series to the MOSFET 51. Therefore, it is possible to appropriately set the voltage (input voltage) of the power source terminal 31 when the LF antenna 21 is driven, by adjusting the charge (current) being absorbed on the MOSFET 51 side which is turned to the conduction state by adjusting the resistance value of the current limiting resistor 52.

(3) In the embodiment, the sensor IC 30 has the antenna drive detection terminal 34 which is electrically connected to the connection point CN between the antenna resonance capacitor 11 and the antenna coil 12 via the third diode 46 and the like, and the antenna drive detection portion 30b which detects whether or not the LF antenna 21 is in the driving state based on a voltage input into the antenna drive detection terminal 34. The MOSFET 51 is turned to the conduction state by the control signal only when the LF antenna 21 is the driving state. Therefore, it is possible to solve a necessity of the switching operation. When it is detected that the LF antenna 21 is not in the driving state in the antenna drive detection portion 30b, that is, the MOSFET 51 is in the non-conduction state when the sensor IC 30 is driven, and thereby it is possible to further save power.

(4) In the embodiment, fluctuation (pulsation) of the voltage (input voltage) of the power source terminal 31 when the LF antenna 21 is driven is suppressed by the resistor 44 and the capacitor 45 (smoothing circuit) and thereby it is possible to suppress that the voltage of the power source terminal 31 is excessive.

(5) In the embodiment, the MOSFET 51 is switching-controlled by the control signal from the charge control portion 30a (sensor IC 30), and thereby for example, it is possible to further simplify the circuit configuration and to reduce costs compared to a case where a control signal from an external circuit (for example, the drive ECU 60) is utilized.

(6) In the embodiment, there is no need to increase a withstand voltage (rated voltage) of the sensor IC 30 in conformity with the induced voltage of the LF antenna 21, and thereby it is possible to reduce sizes and costs thereof. Similarly, there is no need to increase a withstand voltage (rated voltage) of the second diode 43, the resistor 44, and the capacitor 45 in conformity with the induced voltage of the LF antenna 21, and thereby it is possible to reduce costs thereof. Alternatively, since an occupied area of a small-sized element is reduced by employing the small-sized element of a low withstand voltage, it is possible to further reduce a substrate area of the module 10 and further reduce the costs.

(7) In the embodiment, when it is detected that the LF antenna 21 is in the driving state, the function of the sensor IC 30 (lock/unlock detection portion 30c) is stopped by the stop control portion 30d. Therefore, the lock/unlock detection portion 30c does not perform the detection operation at the same time when the LF antenna 21 is in the driving state. When the LF antenna 21 is in the driving state, the lock/unlock detection portion 30c does not output the lock detection signal or the unlock detection signal. Therefore, it is possible to reduce a possibility of occurrence of false detection by superimposing the detection signal with the AC voltage of the first electric wire W1.

(8) In the embodiment, even if electrical connection between the module 10 and the drive ECU 60 is provided by two of the first and second electric wires W1 and W2 (even as a multiplex communication line), it is possible to preferably operate the LF antenna 21 and the sensor IC 30. As the number of the electric wires for electrically connecting between the module 10 and the drive ECU 60 can be reduced, it is possible to reduce in size and weight as an entire device and to reduce costs thereof.

Second Embodiment

Hereinafter, a second embodiment of a door handle device for a vehicle will be described. Moreover, in the second embodiment, since the determination method for setting the switch (MOSFET) of the first embodiment to the conduction state is changed, the detailed description of the same portions will be omitted. Among configurations of the second embodiment, regarding the configuration having the same function as that of the first embodiment, the same reference numerals after ten are given to those of the first embodiment.

Figure 3:
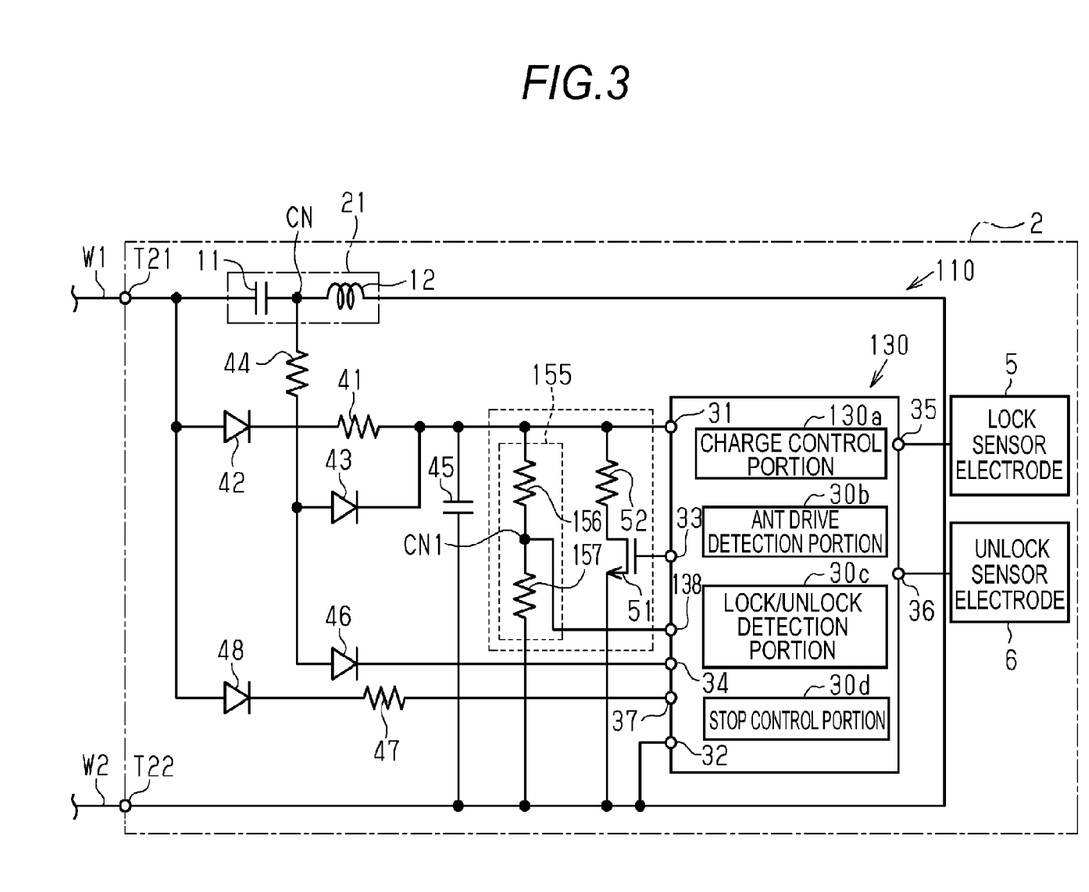
FIG. 3 is a circuit block diagram illustrating an electrical configuration of a door handle device for a vehicle of a second embodiment.

As illustrated in FIG. 3, a sensor IC 130 of a module 110 has a voltage detection terminal 138. On the other hand, a power source terminal 31 is connected to one end of a voltage dividing resistor 156 and the other end of the voltage dividing resistor 156 is connected to one end of a voltage dividing resistor 157. The other end of the voltage dividing resistor 157 is connected to a ground terminal 32. In addition, the voltage detection terminal 138 is connected to a connection point CN1 between both the voltage dividing resistors 156 and 157. Therefore, a voltage which is obtained by dividing the voltage (input voltage) of the power source terminal 31 by the voltage dividing resistors 156 and 157 is input into the voltage detection terminal 138. The voltage dividing resistors 156 and 157 constitute a voltage detection portion 155.

A charge control portion 130a of the sensor IC 130 detects a voltage VPs of the power source terminal 31 based on a voltage input into the voltage detection terminal 138. The charge control portion 130a switching-controls a MOSFET 51 based on the detected voltage VPs. Specifically, for example, when it is detected that the detected voltage VPs exceeds a predetermined threshold value Vth (for example, corresponding to a rated voltage of the sensor IC 130) when a LF antenna 21 is driven, or the like, the charge control portion 130a outputs a control signal so that the MOSFET 51 is turned to the conduction state. Therefore, even if an induced voltage of the LF antenna 21 is excessive, it is possible to prevent the voltage (input voltage) of the power source terminal 31 from being excessive by absorbing the charge (current) on a MOSFET 51 side.

On the other hand, the charge control portion 130a outputs a control signal so that the MOSFET 51 is turned to the non-conduction state when it is detected that the detected voltage VPs does not exceed the threshold value Vth.

As described above in detail, according to the embodiment, in addition to the effects of (1), (2), and (4) to (8) in the first embodiment, the following effects can be obtained.

(1) In the embodiment, the MOSFET 51 is turned to the conduction state by the control signal when the detected voltage VPs exceeds the predetermined threshold value Vth. Therefore, it is possible to solve a necessity of the switching operation. Normally, during driving of the sensor IC 130 in which the detected voltage VPs does not exceed the threshold value Vth, the MOSFET 51 is turned to the non-conduction state. Therefore, it is possible to further save power.

Third Embodiment

Hereinafter, a third embodiment of a door handle device for a vehicle will be described. Moreover, in the third embodiment, since the charge control circuit of the first embodiment is changed to be built in the sensor IC, the detailed description of the same portions will be omitted. Among configurations of the third embodiment, regarding the configuration having the same function as that of the first embodiment, the same reference numerals after ten are given to those of the first embodiment.

Figure 4:
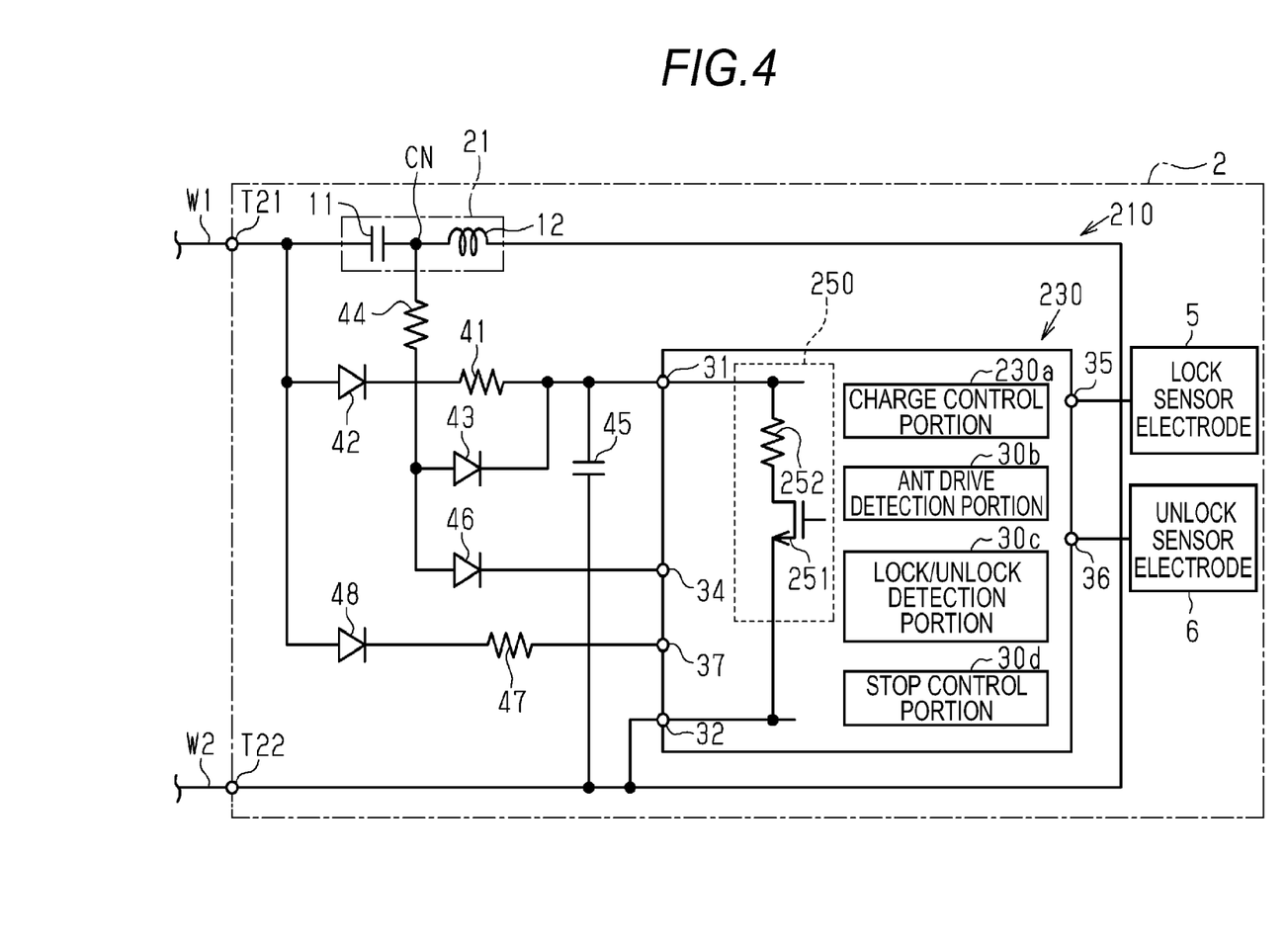
FIG. 4 is a circuit block diagram illustrating an electrical configuration of a door handle device for a vehicle of a third embodiment.

As illustrated in FIG. 4, a charge control circuit 250 is built in a sensor IC 230 of a module 210. The charge control circuit 250 has a MOSFET 251 and a current limiting resistor 252 connected to one end of a drain of the MOSFET 251. The other end of the current limiting resistor 252 is connected to a power source terminal 31 and a source of the MOSFET 251 is connected to a ground terminal 32.

A charge control portion 230a of the sensor IC 230 outputs a control signal to a gate of the MOSFET 251 so as to switching-control the MOSFET 251.

As described above in detail, according to the embodiment, in addition to the same effects of the first embodiment, the following effects can be obtained.

(1) In the embodiment, the charge control circuit 250 is built in the sensor IC 230 and a control signal is outputs from the sensor IC 230 (charge control portion 230a). Therefore, since there is no need to rely on an external circuit (for example, a drive ECU 60), it is possible to reduce the number of external connection terminals disposed in the sensor IC 230 and costs thereof.

Fourth Embodiment

Hereinafter, a fourth embodiment of a door handle device for a vehicle will be described. Moreover, since the fourth embodiment has a configuration in which a constant voltage diode is connected in series to the switch (MOSFET) of the third embodiment, the detailed description of the same portions will be omitted. Among configurations of the fourth embodiment, regarding the configuration having the same function as that of the third embodiment, the same reference numerals after ten are given to those of the third embodiment.

Figure 5:
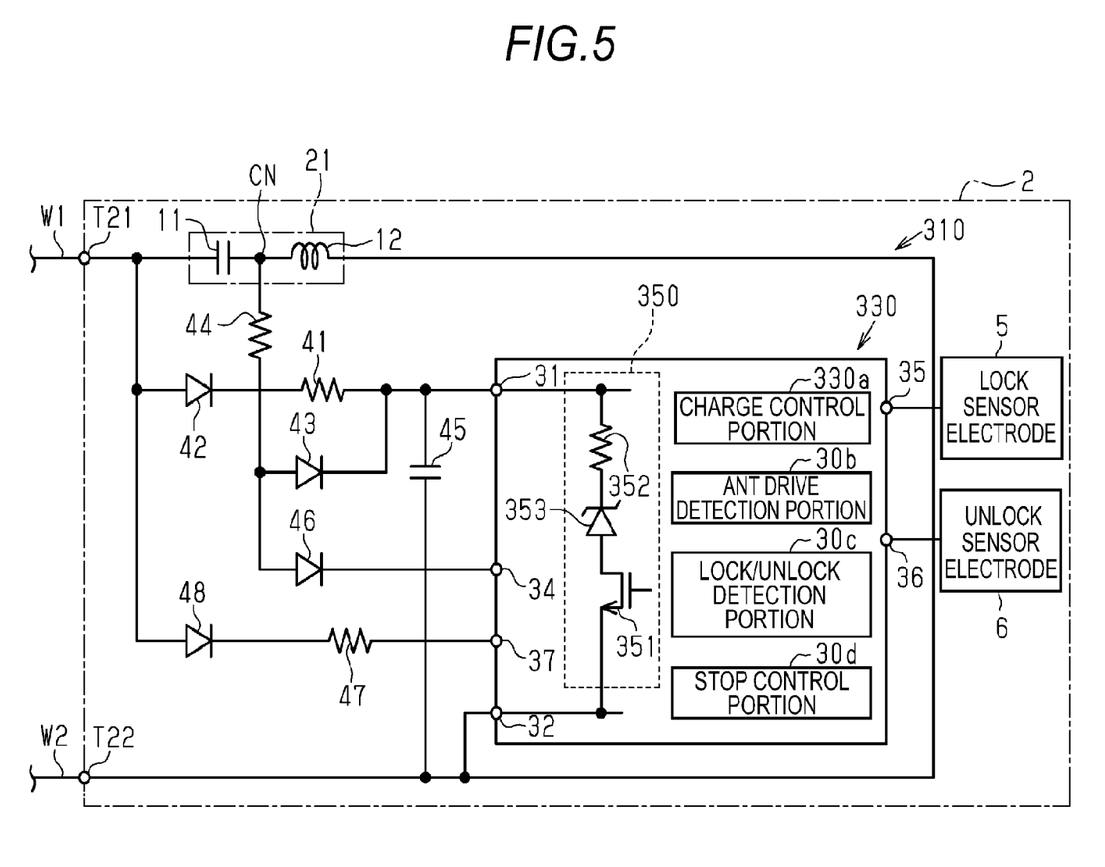
FIG. 5 is a circuit block diagram illustrating an electrical configuration of a door handle device for a vehicle of a fourth embodiment.

As illustrated in FIG. 5, a charge control circuit 350 is built in a sensor IC 330 of a module 310. The charge control circuit 350 has a MOSFET 351 and a Zener diode 353 as a constant voltage diode anode-connected to a drain of the MOSFET 351. A cathode of the Zener diode 353 is connected to one end of a current limiting resistor 352 and the other end of the current limiting resistor 352 is connected to a power source terminal 31. A source of the MOSFET 351 is connected to a ground terminal 32.

A charge control portion 330a of the sensor IC 330 outputs a control signal to the gate of the MOSFET 351 so as to switching-control the MOSFET 351.

As described above in detail, according to the embodiment, in addition to the same effects of the third embodiment, the following effects can be obtained.

(1) In the embodiment, when an induced voltage of a LF antenna 21 is excessive, if the conduction state of the MOSFET 351 is maintained, it is possible to keep the voltage (input voltage) of a power source terminal 31 substantially equal to a voltage corresponding to a breakdown voltage (Zener voltage) of the Zener diode 353. Therefore, the Zener diode 353 of the breakdown voltage that falls within the rated voltage of the sensor IC 330 is employed. Therefore, it is possible to supply a more stabilized voltage that does not interfere with the performance of the sensor IC 330 to the sensor IC 330.

Fifth Embodiment

Hereinafter, a fifth embodiment of a door handle device for a vehicle will be described. Moreover, in the fifth embodiment, since the first diode connected to the power source terminal and the fourth diode connected to the detection signal output terminal of the third embodiment are changed to be common, the detailed description of the same portions will be omitted. Among configurations of the fifth embodiment, regarding the configuration having the same function as that of the third embodiment, the same reference numerals after ten are given to those of the third embodiment.

Figure 6:
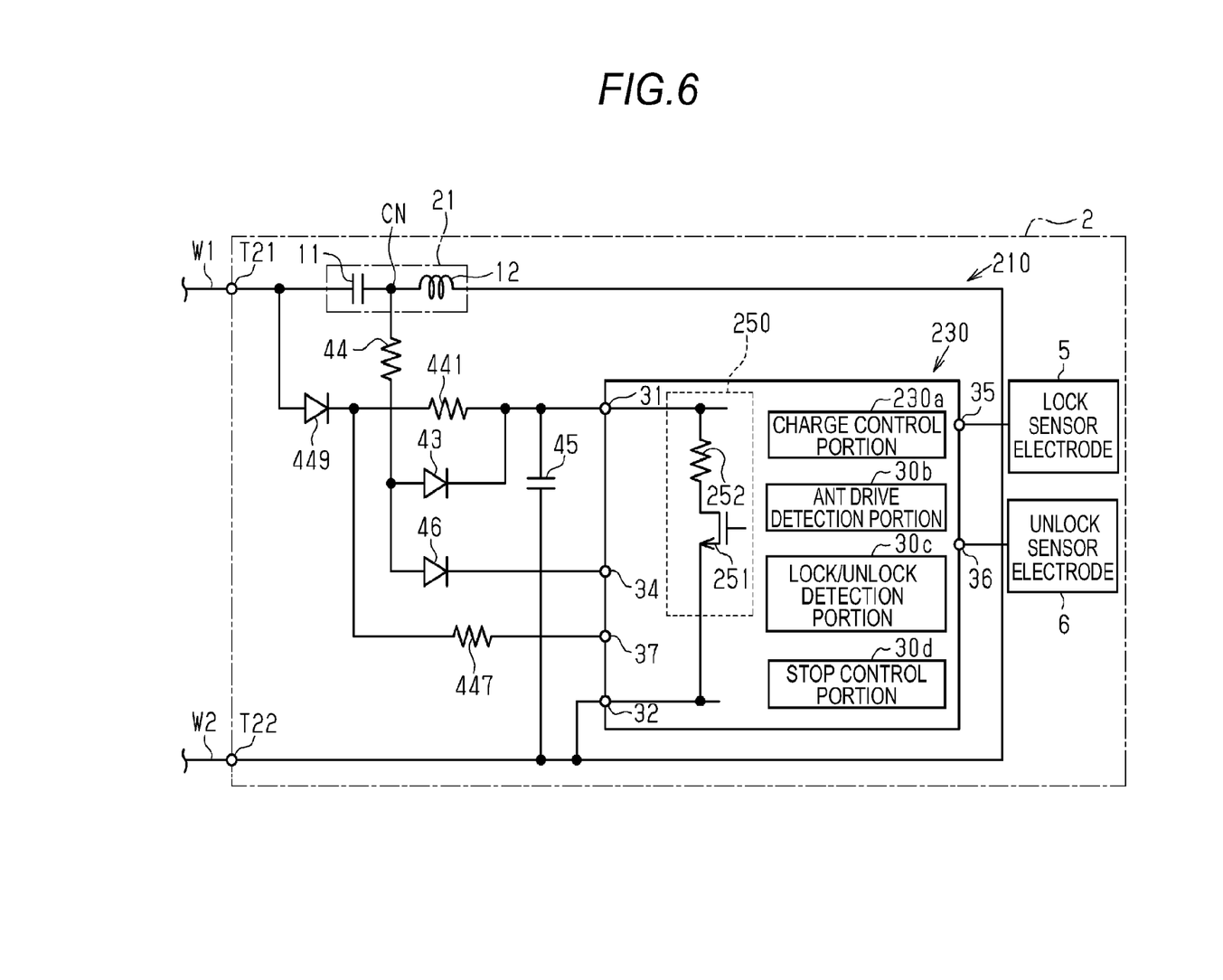
FIG. 6 is a circuit block diagram illustrating an electrical configuration of a door handle device for a vehicle of a fifth embodiment.

As illustrated in FIG. 6, the other end of a resistor 441 one end of which is connected to a power source terminal 31 is connected to a cathode of a first diode 449. In addition, the other end of a resistor 447 one end of which is connected to a detection signal output terminal 37 is connected to the cathode of the first diode 449. An anode of the first diode 449 is connected to a first module-side terminal T21. That is, the first diode 449 is also used as the fourth diode 48 of the third embodiment.

Here, if a power supply portion 60a connects a first electric wire W1 and a second electric wire W2 respectively to a battery +B and a ground, the power source terminal 31 is connected to the battery +B via the resistor 441 and the first diode 449, a ground terminal 32 is connected to the ground, a DC voltage is supplied from a drive ECU 60, and thereby a sensor IC 230 is driven.

On the other hand, when a lock/unlock detection portion 30c outputs a lock detection signal or an unlock detection signal, a current is drawn from the drive ECU 60 to a detection signal output terminal 37 via the first electric wire W1, the first diode 449, and the resistor 447 with a constant current. In this case, if a voltage (power source voltage of the sensor IC 230) of the power source terminal 31 after driving of a LF antenna 21 exceeds a battery voltage (+B), the first diode 449 is reverse-biased, a current cannot be drawn from the drive ECU 60, and an electric charge is removed from a capacitor 45. Therefore, the lock detection signal or the unlock detection signal cannot be output to the drive ECU 60 (lock/unlock control portion 60b).

However, in the embodiment, during driving of the LF antenna 21, a MOSFET 251 of a charge control circuit 250 is turned to the conduction state by the control signal and a charge (current) is absorbed on a MOSFET 251 side, thereby restricting the voltage of the power source terminal 31. Therefore, as described above, it is possible to avoid the reverse bias of the first diode 449 and it is also possible to output the lock detection signal or the unlock detection signal to the drive ECU 60 (lock/unlock control portion 60b).

As described above in detail, according to the embodiment, in addition to the same effects of the third embodiment, the following effects can be obtained.

(1) In the embodiment, the power source terminal 31 and the first diode 449 connected to the detection signal output terminal 37 is to be common. Therefore, it is possible to reduce the number of components and costs thereof.

Moreover, the embodiments described above may be changed as follows.

In the second embodiment, when it is detected that the detected voltage VPs does not exceed the threshold value Vth and the LF antenna 21 is not driven in the antenna drive detection portion 30b, the charge control portion 130a may also cause the MOSFET 51 to be the non-conduction state.

In the second embodiment, when it is detected that the detected voltage VPs exceeds the threshold value Vth and the LF antenna 21 is driven in the antenna drive detection portion 30b, the charge control portion 130a may also maintain the conduction state of the MOSFET 51 until it is detected that the LF antenna 21 is not driven.

In the second embodiment, the charge control portion 130a may also feedback-control the switching operation of the MOSFET 51 so that the detected voltage VPs matches the threshold value Vth. In this case, it is possible to further stabilize the voltage (effective value) of the power source terminal 31.

In the second embodiment, the voltage detection portion 155 may also be built in the sensor IC 130.

In the fourth embodiment, an avalanche diode may be employed instead of the Zener diode 353.

In the first or second embodiment, the constant voltage diode (for example, Zener diode) may also be connected in series to the MOSFET 51.

In the first or second embodiment, the switching control of the MOSFET 51 by the drive signal may also be performed by an external circuit (for example, the drive ECU 60).

In the first, second, or fourth embodiment, the first diode 42 connected to the power source terminal 31 and the fourth diode 48 connected to the detection signal output terminal 37 may also be common according to the fifth embodiment. In this case, it is possible to reduce the number of components and costs thereof.

In the first, and third to fifth embodiments, the voltage detection portion 155 may be provided according to the second embodiment. The charge control portions 30a, 230a, and 330a may also output the control signal so that the MOSFETs 51, 251, and 351 are in the conduction state also with reference to the detection result of the voltage VPs by the voltage detection portion 155.

In each embodiment, a varistor may also be employed instead of or in addition to the current limiting resistors 52, 252, and 352.

In each embodiment, the current limiting resistors 52, 252, and 352 may also be omitted.

In each embodiment, the resistor 44 may also be disposed on the cathode side of the second diode 43.

In each embodiment, a MOSFET of a P channel may also be employed instead of the MOSFETs 51, 251, and 351 of the N channel. Alternatively, an N-type or P-type bipolar, or a relay may also be employed.

In each embodiment, the second electric wire W2 is omitted and each of the second control portion-side terminal T12 and the second module-side terminal T22 may also be grounded (case body grounded by a vehicle body) as it is with an appropriate electric wire. That is, the second connection line may be a case body for grounding the drive ECU 60 and the LF antenna 21 and the sensor ICs 30, 130, 230, and 330. In this case, as the second electric wire W2 to be wired throughout between the modules 10, 110, 210, and 310, and the drive ECU 60 is unnecessary, it is possible to further reduce the size and weight of the entire device.

In each embodiment, the antenna drive detection portions 30b of the sensor ICs 30, 130, 230, and 330 may also detect the drive of the LF antenna 21, for example, by monitoring the voltage change of the power source terminal 31. Alternatively, so-called transformer coupling coils are disposed in the vicinity of the antenna coil 12, an AC voltage which is induced in the coils is monitored by the antenna drive detection portion 30b of the sensor IC 30, and thereby the drive of the LF antenna 21 may also be detected.

In each embodiment, the stop control portion 30d may also be omitted. That is, when it is detected that the LF antenna 21 is in the driving state, the functions of the sensor ICs 30, 130, 230, and 330 may also not be stopped.

In each embodiment, the sensor ICs 30, 130, 230, and 330 may also be manufactured with a microcomputer or the like with an analog element such as a regulator or a transistor.

In each embodiment, the displacements of the lock detection region 3 and the unlock detection region 4, and the displacements and the shapes of the lock sensor electrode 5 and the unlock sensor electrode 6 corresponding thereto in the outside door handle 2 may also be appropriately changed.

In each embodiment, one of functions of the detection of approach or contact of the hand of a person to the lock detection region 3, and the detection of approach or contact of the hand of a person to the unlock detection region 4 by the lock/unlock detection portion 30c may be omitted.

In each embodiment, the sensor ICs 30, 130, 230, and 330 may also detect approach or contact of a person with a contact/approach sensor alone such as an electrostatic capacity-type sensor, a shock sensor, a pyroelectric sensor, a pressure sensor, an infrared sensor, or a RFID, or in any combination thereof.

A door handle device for a vehicle according to an aspect of this disclosure includes an antenna and a detection member capable of detecting approach or contact of a person. The antenna and a detection member are electricity connected to a drive control portion via a first connection line and a second connection line, and are connected in parallel to each other. The antenna is driven by an AC voltage supplied from the drive control portion, the first connection line and the second connection line are respectively connected to a positive DC power source and a ground, and thereby the detection member is driven by a DC voltage supplied from the drive control portion. The antenna includes a resonance capacitor and an antenna coil which are connected in series. The detection member includes a power source terminal which is electrically connected to the first connection line and a connection point between the resonance capacitor and the antenna coil respectively via a first diode and a second diode, and a ground terminal which is electrically connected to the second connection line. The door handle device further includes a charge control circuit, which includes a switch that is electrically connected to the power source terminal and the ground terminal, and performs a switching operation in accordance with a control signal.

According to this configuration, the antenna is driven by supplying the AC voltage from the drive control portion via the first connection line and the second connection line.

On the other hand, when the antenna is not driven, the power source terminal is connected to the positive DC power source via the first diode and the first connection line, the ground terminal is connected to the ground via the second connection line, and the DC voltage is supplied from the drive control portion, and thereby the detection member is driven and is capable of detecting approach or contact of a person.

Alternatively, when the antenna is driven, the power source terminal is connected to the connection point between the resonance capacitor and the antenna coil via the second diode, the induced voltage of the antenna is supplied, and thereby the detection member is driven and is capable of detecting approach or contact of a person. In this case, even if the induced voltage of the antenna is excessive, the switch of the charge control circuit is turned to the conduction state by the control signal, a charge (current) is absorbed on a switch side, and thereby it is possible to suppress an excessive voltage (input voltage) of the power source terminal. In other words, it is possible to secure the induced voltage of the antenna, that is, an output level of the antenna and preferably secure a communication distance thereof without an excessive voltage (input voltage) of the power source terminal.

In the door handle device for a vehicle, it is preferable that the charge control circuit includes a current limiting resistor which is connected in series to the switch.

According to this configuration, a charge (current) to be absorbed on the switch side which is in the conduction state is adjusted by adjusting a resistance value of the current limiting resistor. Therefore, it is possible to preferably set a voltage (input voltage) of the power source terminal when the antenna is driven.

In the door handle device for a vehicle, it is preferable that the charge control circuit includes a constant voltage diode connected in series to the switch.

According to this configuration, when the induced voltage of the antenna is excessive, if the conduction state of the switch is maintained, it is possible to keep the voltage (input voltage) of the power source terminal substantially equal to a voltage corresponding to a breakdown voltage of the constant voltage diode. Therefore, the constant voltage diode of the breakdown voltage that falls within the rated voltage of the detection member is employed. Therefore, it is possible to supply a more stabilized voltage that does not interfere with the performance of the detection member to the detection member.

In the door handle device for a vehicle, it is preferable that the detection member includes an antenna drive detection terminal that is electrically connected to the connection point between the resonance capacitor and the antenna coil, and an antenna drive detection portion that detects whether or not the antenna is in a driving state based on a voltage input into the antenna drive detection terminal, and the switch is turned to a conduction state by the control signal when it is detected that the antenna is in the driving state by the antenna drive detection portion.

According to this configuration, the switch is the conduction state by the control signal only when the antenna is in the conduction state. Therefore, it is possible to solve a necessity of a switching operation.

It is preferable that the door handle device for a vehicle further includes a voltage detection portion that detects a voltage of the power source terminal, in which the switch is turned to the conduction state by the control signal when it is detected that a detected voltage of the power source terminal exceeds a predetermined threshold voltage.

According to this configuration, the switch is turned to the conduction state by the control signal only when the detected voltage of the power source terminal exceeds the predetermined threshold voltage (for example, corresponding to the rated voltage of the detection member). Therefore, it is possible to solve a necessity of the switching operation.

In the door handle device for a vehicle, it is preferable that the charge control circuit is built in the detection member and the control signal is output from the detection member.

According to this configuration, the charge control circuit is built in the detection member and the control signal is output from the detection member. Therefore, since there is no need to rely on an external circuit (for example, a drive control portion), it is possible to reduce the number of external connection terminals disposed in the detection member.

The aspect of this disclosure has an effect of being able to suppress supply of overvoltage to the detection member without impairing convenience.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door handle device for a vehicle comprising:
    an antenna and
    a detection member capable of detecting approach or contact of a person,
    the antenna and the detection member being electrically connected to a drive control portion via a first connection line and a second connection line, and being connected in parallel to each other,
    wherein the antenna is driven by an AC voltage supplied from the drive control portion, the first connection line and the second connection line are respectively connected to a positive DC power source and a ground, and thereby the detection member is driven by a DC voltage supplied from the drive control portion,
    the antenna includes a resonance capacitor and an antenna coil which are connected in series,
    the detection member includes
        a power source terminal which is electrically connected to the first connection line and a connection point between the resonance capacitor and the antenna coil respectively via a first diode and a second diode, and
        a ground terminal which is electrically connected to the second connection line, and
    the door handle device further comprises a charge control circuit, which includes a switch that is electrically connected to the power source terminal and the ground terminal, and performs a switching operation in accordance with a control signal.

2. The door handle device for a vehicle according to claim 1,
    wherein the charge control circuit includes a current limiting resistor which is connected in series to the switch.

3. The door handle device for a vehicle according to claim 2,
    wherein the charge control circuit includes a constant voltage diode connected in series to the switch.

4. The door handle device for a vehicle according to claim 2,
    wherein the detection member includes
        an antenna drive detection terminal that is electrically connected to the connection point between the resonance capacitor and the antenna coil, and
        an antenna drive detection portion that detects whether or not the antenna is in a driving state based on a voltage input into the antenna drive detection terminal, and
    the switch is turned to a conduction state by the control signal when it is detected that the antenna is in the driving state by the antenna drive detection portion.

5. The door handle device for a vehicle according to claim 2, further comprising:
    a voltage detection portion that detects a voltage of the power source terminal,
    wherein the switch is turned to the conduction state by the control signal when it is detected that a detected voltage of the power source terminal exceeds a predetermined threshold voltage.

6. The door handle device for a vehicle according to claim 2,
    wherein the charge control circuit is built in the detection member and the control signal is output from the detection member.

7. The door handle device for a vehicle according to claim 1,
    wherein the charge control circuit includes a constant voltage diode connected in series to the switch.

8. The door handle device for a vehicle according to claim 7,
wherein the detection member includes
an antenna drive detection terminal that is electrically connected to the connection point between the resonance capacitor and the antenna coil, and
an antenna drive detection portion that detects whether or not the antenna is in a driving state based on a voltage input into the antenna drive detection terminal, and
the switch is turned to a conduction state by the control signal when it is detected that the antenna is in the driving state by the antenna drive detection portion.

9. The door handle device for a vehicle according to claim 7, further comprising:
a voltage detection portion that detects a voltage of the power source terminal,
wherein the switch is turned to the conduction state by the control signal when it is detected that a detected voltage of the power source terminal exceeds a predetermined threshold voltage.

10. The door handle device for a vehicle according to claim 7,
wherein the charge control circuit is built in the detection member and the control signal is output from the detection member.

11. The door handle device for a vehicle according to claim 1,
wherein the detection member includes
an antenna drive detection terminal that is electrically connected to the connection point between the resonance capacitor and the antenna coil, and
an antenna drive detection portion that detects whether or not the antenna is in a driving state based on a voltage input into the antenna drive detection terminal, and
the switch is turned to a conduction state by the control signal when it is detected that the antenna is in the driving state by the antenna drive detection portion.

12. The door handle device for a vehicle according to claim 11, further comprising:
a voltage detection portion that detects a voltage of the power source terminal,
wherein the switch is turned to the conduction state by the control signal when it is detected that a detected voltage of the power source terminal exceeds a predetermined threshold voltage.

13. The door handle device for a vehicle according to claim 11,
wherein the charge control circuit is built in the detection member and the control signal is output from the detection member.

14. The door handle device for a vehicle according to claim 1, further comprising:
a voltage detection portion that detects a voltage of the power source terminal,
wherein the switch is turned to the conduction state by the control signal when it is detected that a detected voltage of the power source terminal exceeds a predetermined threshold voltage.

15. The door handle device for a vehicle according to claim 14,
wherein the charge control circuit is built in the detection member and the control signal is output from the detection member.

16. The door handle device for a vehicle according to claim 1,
wherein the charge control circuit is built in the detection member and the control signal is output from the detection member.

* * * * *